Figure 1:
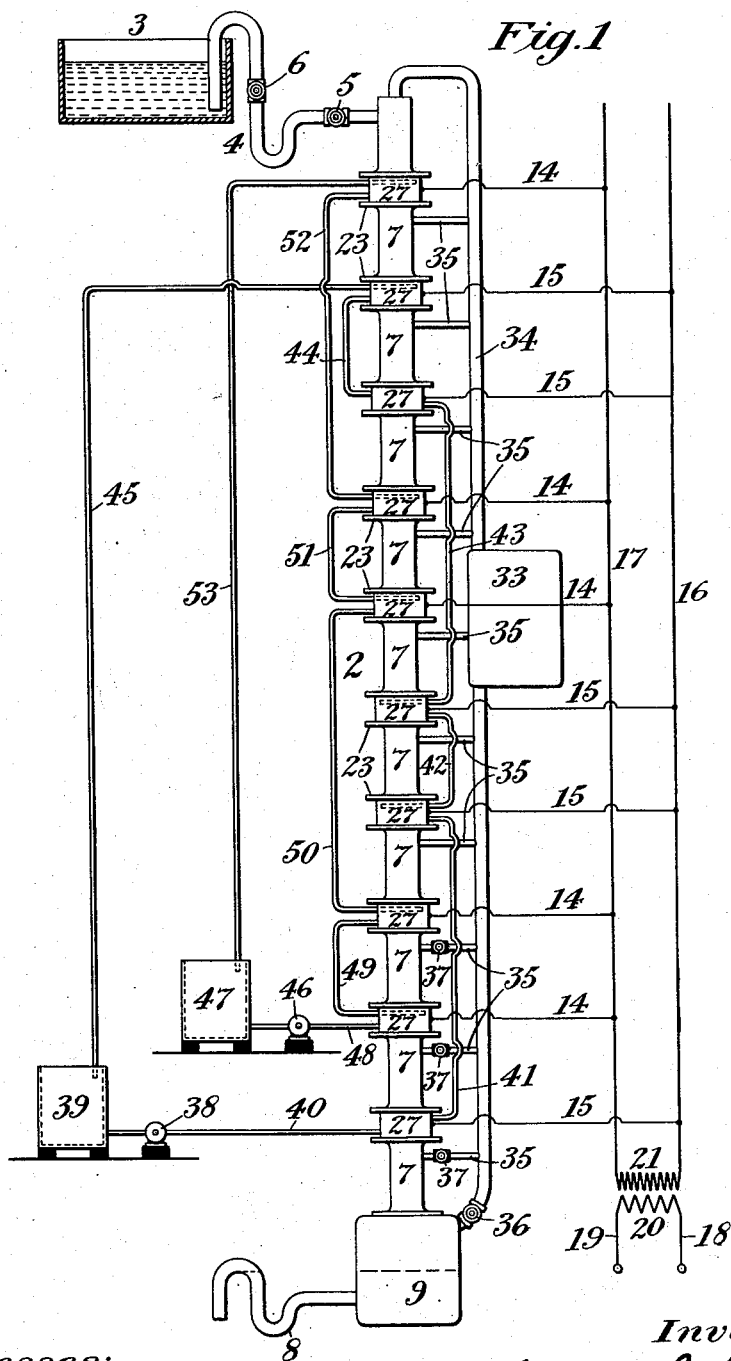

J. L. GOUCHER.
METHOD OF TREATING MILK.
APPLICATION FILED JAN. 17, 1907.

918,531.

Patented Apr. 20, 1909.
3 SHEETS—SHEET 1.

Witnesses:
Chas. D. King.
R. Champion

Inventor:
James L. Goucher,
by
Atty.

J. L. GOUCHER.
METHOD OF TREATING MILK.
APPLICATION FILED JAN. 17, 1907.
918,531.
Patented Apr. 20, 1909.
3 SHEETS—SHEET 2.
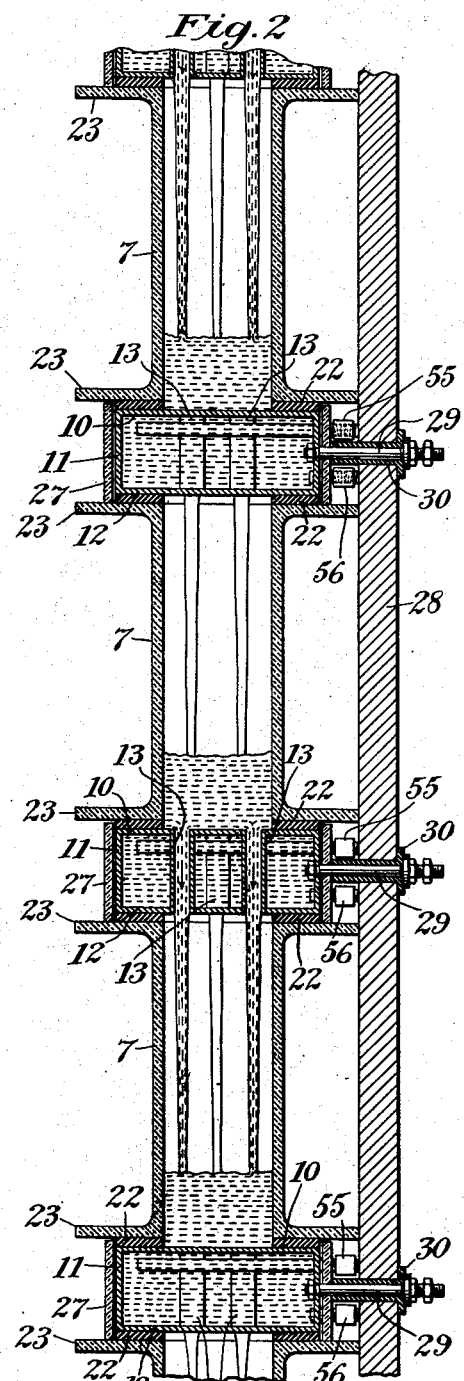
Fig. 2
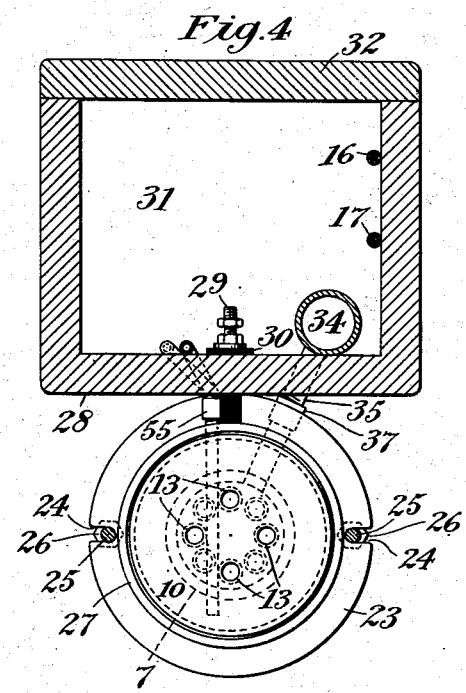
Fig. 3
Fig. 4
Witnesses
Chas. D. King.
R. Champion
Inventor:
James L. Goucher,
by
[signature]
Atty.

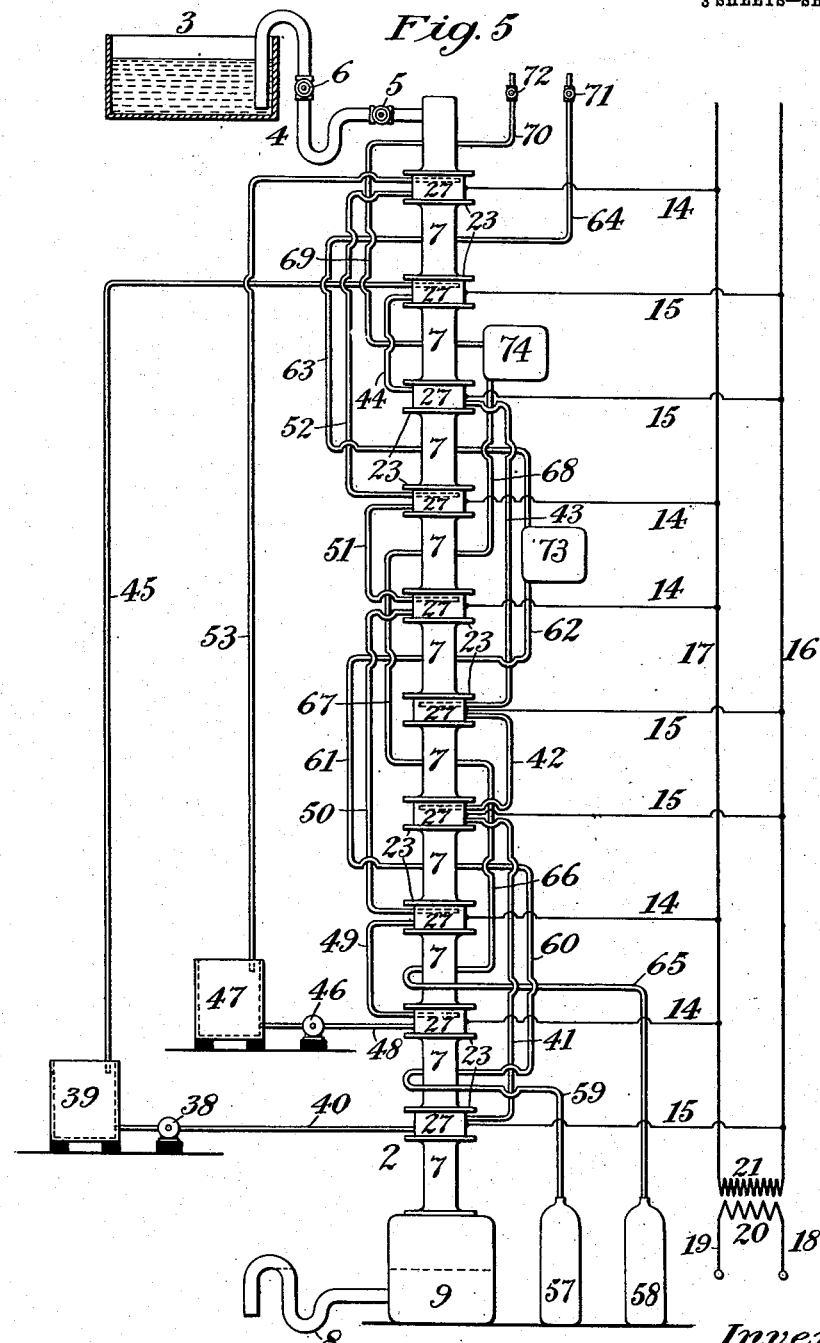

UNITED STATES PATENT OFFICE.

JAMES L. GOUCHER, OF NEW YORK, N. Y., ASSIGNOR TO GOUCHER ELECTRIC PURIFYING CO., OF NEW YORK, N. Y., A CORPORATION OF NEW YORK.

METHOD OF TREATING MILK.

No. 918,531.　　　　Specification of Letters Patent.　　Patented April 20, 1909.

Application filed January 17, 1907. Serial No. 352,810.

*To all whom it may concern:*

Be it known that I, JAMES L. GOUCHER, a citizen of the United States, and a resident of New York, in the county of New York and State of New York, have invented certain new and useful Improvements in Methods of Treating Milk, of which the following is a specification.

This invention relates to a method of treating milk to purify the same, the main object of the invention being to provide an improved process for destroying the colonies of bacteria which are always present in milk in its ordinary state and which are propagated rapidly under the ordinary conditions surrounding the handling, shipment and use of milk.

The present invention is in the nature of an improvement upon that shown, described and claimed in a prior application filed September 18th, 1906, Serial No. 335,131, in which there are disclosed a method and apparatus similar in many respects to the method and apparatus disclosed in the present application, so far as the main features thereof are concerned.

While the destruction of bacteria in milk, and particularly by electrical action, has been attempted by others heretofore, in none of the processes employed by others has anyone, so far as I am aware, succeeded in eliminating from milk all or substantially all of the bacteria normally found therein. This I believe has been due partly to the fact that the proper treatment by electricity for the purpose of destroying bacteria therein has not been fully understood, and partly to the fact that no sufficient provision has been made for preventing the contamination of partly purified milk by bacteria in the air surrounding such milk.

As set forth in my prior application, I have found by experiment that in order to destroy bacteria in milk quickly and without injuriously affecting the quality or taste of the milk, it is important to subject the milk to the action of electricity in such a manner as to avoid overheating the milk, it being preferable to employ a current of moderately high voltage and low amperage, which will destroy the bacteria in the milk quickly but will have no harmful effect upon the milk. An alternating current of electricity is in the present, as in the prior case preferably employed, as by its use the purification of the milk is accomplished more quickly than by means of direct current. The destruction of bacteria in milk by electrical action I believe, as the result of my experiments, to be due both to the direct action of electric current upon the colonies of bacteria and to the formation and release of ozone gas from the liquid, which gas when so formed and liberated exerts in the nascent state a very strong action upon the whole body of liquid with which it comes in contact, and destroys instantly all colonies of bacteria through which the gas passes.

When milk exposed to the air is subjected to the action of an alternating current of suitable voltage and amperage the number of colonies of bacteria in each cubic centimeter will be reduced far below the number ordinarily found in the best grades of milk on the market. When the action takes place in the manner set forth in my prior application, viz., by first subjecting the milk while exposed to the air to the action of such an electric current, and during the last stage of the process subjecting said milk while out of contact with the air to the action of electric current, the number of colonies in each cubic centimeter may be reduced to not more than a few hundred; and when the proper care is exercised all colonies may be entirely destroyed. I have found, however, that it is desirable to carry on the whole process while the milk is out of contact with the outside air, and that unless the milk is treated in this way there is always danger that some colonies of bacteria may remain in the treated milk or be introduced into it by exposure to the air before the milk is bottled. For the purpose of destroying all of these colonies with certainty, even when the apparatus is operated and the process carried out by the average operators found in large dairies, it is desirable to inclose the milk throughout the whole period during which it is subjected to electrical treatment for the destruction of bacteria therein; and a process and apparatus adapted for the treatment of milk in this manner for the destruction of the bacteria therein constitute the principal features of my improvements over the process and apparatus disclosed in my aforesaid prior application.

In the experiments which I have conducted since the filing of my aforesaid application, I have found that much better results are obtained by passing the electric current through a stream of milk lengthwise of the stream if such stream is reduced in cross sectional area to such a size as will enable the electric current to pass readily through substantially all the particles of the stream, and hence an important feature of my improvements is the subjection of small or fine streams of milk to the action of electric current passing therethrough lengthwise of the same. In practice these streams are formed to the best advantage by causing milk to fall vertically from a suitable source of supply through openings of the proper area, which reduce a large stream of milk to a plurality of small streams, the total flow of which represents the capacity of the machine, that is, the rate at which milk flowing therethrough may be freed from bacteria.

Other features of my improved process of purifying milk will be hereinafter more fully set forth, the various features of the invention being illustrated in the accompanying drawings, in which—

Figure 1 is a side elevation, partly in section, illustrating diagrammatically a milk-treating apparatus for carrying out my present invention. Fig. 2 is an enlarged vertical section of a portion of said apparatus illustrating in detail the construction of a portion of the chamber or pipe through which the stream of milk flows, and also illustrating certain electrical connections and other features which will be referred to hereinafter. Fig. 3 is a similar view of two sections of the pipe or chamber and means for connecting the same. Fig. 4 is a horizontal sectional plan of the same and of a hollow support in which the electrical conductors and certain other parts may be inclosed. Fig. 5 is a view similar to Fig. 1 illustrating a modification of the invention.

Similar characters designate like parts in all the figures of the drawings.

In carrying into effect the present invention I prefer to employ as the chamber in which the milk is subjected to treatment a closed pipe of large diameter, designated generally by 2, in which the milk may be confined and treated out of contact with the outside air. This chamber or pipe may be of any suitable construction and material and may be placed in any suitable position, but will preferably be a sectional round pipe of insulating material, such as glass, disposed in a vertical position in order that the flowing stream of milk may fall vertically through such chamber or pipe and be treated at the maximum rate of speed without the use of any other means than gravity for keeping the milk in motion. The milk may be delivered to this chamber or pipe from any suitable source of supply, preferably from a tank, such as 3, connected with the upper end of the chamber or pipe 2. The connection between said supply-tank and the upper end of the vertical chamber 2 should be such as to prevent influx of outside air into said chamber. In order to accomplish this I prefer to employ as the connection between said supply-tank and the chamber 2 a pipe in the form of a siphon 4, in which milk will always stand at such a height as to seal the upper end of the chamber in which the milk is to be treated. For the purpose of closing communication between the supply-tank and the receiving end of the chamber 2 and for regulating the flow of milk from the supply-tank, I prefer to employ suitable stop-cocks, such as 5 and 6. The chamber or pipe 2 is of considerable length and is preferably divided into a plurality of sections, which in this construction are interchangeable with one another. These sections are designated by 7, and should be connected in such a manner that anyone of them may be readily removed and a new one substituted in case of damage or destruction of a section. At the lower end of the chamber 2 formed by these connected sections of pipe there is also preferably a seal which prevents the influx of outside air to the chamber in which the milk is treated. This seal may also be formed in substantially the same manner as the seal at the upper end of the chamber, that is, by a pipe such as 8 bent to form a trap, which in the construction illustrated is connected to the lower end of a vessel 9 to which the lowermost section of the pipe 2 is fastened. These devices coöperate with the vertical chamber 2 and with the corresponding devices at the inlet end of said chamber to seal the chamber effectually when the milk in the tank 3 and in the vessel 9 is at the proper levels indicated in Fig. 1. When so sealed bacteria laden air outside the apparatus can not enter the apparatus and contaminate the purified milk treated in the chamber 2.

In order that the milk flowing through the chamber 2 may be fully exposed to the action of the electric current, the large stream is preferably broken up into a number of fine streams through which current may circulate lengthwise of the stream. Any suitable means may be employed for breaking up a large body or column of milk into a plurality of small streams of considerable length, one or more partitions in the tubular chamber 2 being illustrated herein for the purpose. In the apparatus shown in Fig. 1, ten such partitions are illustrated, although a considerably smaller number may be used without defeating the object of the invention. These partitions are preferably of like construction and spaced at substantially regular intervals. Each should substantially fill the chamber 2 transversely, and each has openings through which streams of milk of small area may flow. These partitions may be of any suitable type and construction so long as they prevent the free flow of the full stream or column of milk and permit the flow of smaller streams than the main column of milk. As milk does not fall properly through perforations in thin partitions, I prefer to make use of partitions having long vertical tubular openings which serve to guide the small streams of milk as well as to determine their size, that is, their cross-sectional area. Here a partition having such openings is shown at 10 and is embodied in a short closed cylinder through which a body of water or other cooling medium may be circulated, if desired, out of contact with the milk, for the purpose of reducing the temperature of the milk. This cylinder has two heads, one of which is the partition 10 and the other of which is indicated at 12, connected by tubes 13 forming the tubular openings through which the small streams of milk flow. These cylinders 11 will usually be made of conducting material throughout such as aluminum, or brass or iron coated with tin or nickel and constitute the electrodes from which the current flows through one or more fine streams of milk to the opposite electrode of an electric circuit.

In the apparatus illustrated in Fig. 1, the electrodes 11 are connected in pairs to conductors leading from opposite sides of a source of electric current, which may be mains of an ordinary incandescent light circuit. The manner in which these connections are made will be clear by referring to Fig. 1, in which 14 and 15 are the conductors leading to the terminals of successive pairs of electrodes 11, and 16 and 17 are the opposite sides of a circuit of relatively high voltage, the current in which is derived from the mains 18 and 19 of a suitable source of energy, such as an incandescent light circuit, through a proper step-up transformer, the primary and secondary of which are indicated at 20 and 21 and are connected up in the two circuits in the usual manner. It will be noticed that when the apparatus is connected up to a source of electricity in the manner just described, the falling streams of milk will receive electrical treatment in alternate sections 7 of the tubular chamber 2, although the milk may be treated in all sections if desired.

The cylinders or electrodes 11 are in the construction shown spaced at regular intervals and fastened in place between the ends of adjacent sections. In order to assure a tight joint between the parts at the point of connection, rubber or other washers 22 may be placed at opposite ends of each cylinder 11, and the adjacent ends of the sections 7 drawn together and secured in place. In order to accomplish this, each section 7 may have flanges 23 at its ends, which flanges may be connected by detachable devices capable of drawing the flanges of the two sections toward each other and compressing the washers 22. Here the flanges have diametrical peripheral notches 24 adapted to receive the smooth shanks of screws 25 the heads of which are stopped at one end against one flange and the points of which have adjustable nuts 26 which are stopped against the flange of the other section. The manner in which these parts may be clamped and loosened will be obvious. Each washer preferably has a central opening of the same area as the area of the opening in the section 7, and each electrode and its pair of washers are preferably inclosed by a short section of tubing, such as 27, which is also preferably of glass.

Connection to the different electrodes for the purpose of supplying electric current thereto may be made in any suitable manner. Here all of the sections of the tubular chamber 2 are mounted on a support which should be of insulating material, such for example as slate or wood, this support being indicated at 28. Through said insulating support pass a plurality of terminal-screws, such as 29, each of which has a long smooth shank mounted in the insulating bushing 30 passed through a corresponding opening in the insulating support 28. Suitable nuts at opposite ends of said screws 29 serve to hold in place the electrodes secured thereto. The inner ends of the terminal-screws 29 pass through the short glass tube 27 and also through the adjacent metallic wall of the electrode 11. The short conductors 14 and 15 are secured to the binding-posts of the terminal-screws 29 in the usual manner, and all of these wires, as well as the wires 16 and 17, are preferably inclosed in a box-like support such as 31, one of the walls of which is the support 28, and another wall of which, such as 32, may constitute a swinging or removable door or section.

The parts just described are sufficient for the purpose of forming a milk-treating apparatus in which bacteria may be destroyed by the action of electric current, preferably alternating, passed through streams of milk in the direction of the length of each stream, as it will be evident that when the current is turned on while milk is flowing through the apparatus in the manner illustrated in Fig. 2, in which it will be seen that milk is falling vertically in streams of small area alternating with streams of large area, it will pass from one electrode 11 to the opposite electrode 11 through the streams of milk, and every particle of the small streams of milk will be subjected to the action of such electric current. Moreover, the column or stream of milk of larger area resting on the tops of the electrodes, as shown in Fig. 2, will also be subjected to thorough electrical treatment, as the mass is kept in constant movement and is thoroughly agitated by the falling of the small streams of milk. The current used may of course be regulated in a manner well understood, and the resistance and the height of each large column of milk in a section 7 of the tube may also be regulated, the regulation of the height of such column of milk being effected by opening the stop-cock 5 or 6 to the desired extent to increase or decrease the flow of milk from the tank 3.

In operating an apparatus of the type just described I have found that the falling columns of milk displace a considerable quantity of air which it is difficult to get rid of without making special provision therefor. When there is no milk in the tubular chamber 2 there is a large body of air in said chamber, and after the flow of milk is started a considerable portion of this body of air is displaced and forced down by the falling columns and streams of milk. The amount displaced in each section 7 of the tubular chamber 2 is indicated approximately in Fig. 2, which shows the apparatus in operation. The total amount of air displaced from all of the sections 7 is so great that I have found it convenient in actual operation to provide means for receiving temporarily the bodies of air driven out of the respective sections 7 and restoring them to such sections when the flow of milk ceases. The means provided for the purpose constitutes a means for automatically regulating the air pressures in the different sections 7 of the tube 2 and maintaining the pressures in the different sections substantially constant without introducing outside air into the apparatus. I effect this result by providing a regulating device controlled by air pressure within and without the apparatus, this device being shown as a large reservoir or bag 33 having walls of thin rubber and adapted to be inflated by air forced into it from the inside of the tube 2 and collapsed by atmospheric pressure outside the apparatus when there is no milk flowing in the tube 2. This bag 33 is shown as connected to a large pipe 34 the ends of which are connected with the main tube 2 near opposite ends of the same, branch connections, such as the pipes 35, being illustrated as connecting said large pipe 34 with the respective sections 7 of the tube 2. When the supply of milk is turned on and enters the top of the tube 2, in falling therethrough it displaces a considerable portion of the air confined in each section 7 of said tube 2, and the air so displaced is forced out through the corresponding connecting tube 35 and large pipe 34 into the regulating device 33, which is considerably expanded when the apparatus is fully in action, that is, when milk is flowing in every section 7 of the tube 2 from the top to the bottom of the apparatus. As soon as the milk stops flowing, a partial vacuum is created in the pipe 2, which is filled by the collapsing of the bag 33 by atmospheric pressure without the apparatus and consequent rush of the air in the bag 33 and in the pipe 34 through the connecting pipes 35 back into the main tube.

For the purpose of cutting off communication between the regulating device and the main tube 2, a stop-cock may be placed in the pipe 34 at the bottom thereof, as indicated at 36; and stop-cocks, such as 37, may also be placed in the connecting pipes 35 at points close to the main tube 2. These cocks are especially useful for the purpose of isolating the main tube and the regulating device from each other during cleaning of the apparatus.

Ordinarily the temperature of milk through which electric current is passing in the tube 2 will not be raised dangerously high by the action of such current if it is of proper voltage and amperage, as for example, when current is used from an ordinary incandescent light circuit stepped up to about 1100 volts. In order that the temperature of the milk may be kept low under all conditions, however, it may be desirable in some cases to cool the milk during the period of treatment with the electric current, and I have shown herein means for circulating a cooling medium through the apparatus out of contact with the milk.

In Fig. 1 a water circulating system is shown, which is divided into two parts or systems, an insulated water-circulating apparatus being shown for constantly circulating cold water through one group of electrodes, another water-circulating apparatus for circulating cold water through another group of electrodes. One of these systems comprises in the construction illustrated a reservoir from which water is drawn by a pump and pumped through the hollow chambers of all of the electrodes which are connected to the conductor 16, while the other system comprises a reservoir and a pump for circulating cold water through the chambers of all of the electrodes which are connected to the electrical conductor 17. These two systems are insulated from each other, as illustrated, a pump 38 and a reservoir 39 mounted on insulating supports being connected by pipes 40, 41, 42, 43, 44, and 45 in a closed circuit with the chambers within five of the electrodes 11; while in a corresponding manner a similar pump 46 and a reservoir 47 are connected by pipes 48, 49, 50, 51, 52 and 53 in a closed circuit with the chambers within the other five electrodes of the series. When the electrodes are electrically connected in the manner illustrated it is necessary to divide the cooling apparatus, if used, into two insulated systems connected up in substantially the manner just described. The circulation of the cooling medium in each of these two systems, it will be noticed, is from the bottom toward the top of the apparatus. Moreover, each pipe in the cooling system at its inlet end in the chamber of an electrode 11 is at the bottom and near one side of such chamber, while the outlet from such chamber is through a pipe placed near the top of said chamber and preferably at the side opposite that at which the water enters the chamber. The object of this is to assure a thorough circulation of the water through the chamber and around the vertical tubes 13 in the horizontal electrodes through which the milk falls. The different sections of pipe which enter the chambers of the respective electrodes 11 and which also pass through the walls of the short closed tubes 27, are shown in Fig. 2 as divided at a point adjacent to the support 28 and as having unions 55 and 56 by means of which the main portions of the water-circulating apparatus may be readily connected with or disconnected from the short sections of pipe carried by the electrodes.

Not only is the falling body of milk divided into streams of small area which fall vertically and evenly through the chamber 2, but it is also desirable that the milk in falling shall be as thoroughly agitated mechanically as possible. The falling of the small stream of milk onto the partitions 10 of the electrodes 11 serves to agitate the milk and thoroughly mix the same, and the partitions are preferably so placed that the falling streams of milk will strike the partitions instead of falling directly through the openings therein. Hence, in the preferred organization of the parts, the successive partitions have their openings 13 staggered instead of placed so as to register with one another. The manner in which the openings 13 are located in the different partitions is indicated in Fig. 4. It will be noticed that each partition has a group of openings, four in number in the construction shown, which openings have like areas and are disposed equidistantly about a common vertical axis, which is the longitudinal axis of the tube 2, the construction of each partition being the same and the staggering of the openings being effected by the angular adjustment of each partition about the longitudinal axis of the tube 2.

In Fig. 5 I have illustrated a modification of the apparatus in which the main elements of the system for circulating the milk, for subjecting the same to the action of electric current, and for cooling the milk during such electrical treatment, are the same as in the system shown in Fig. 1, and they are designated by corresponding reference characters. In this view, however, while I have shown means for automatically regulating the pressure of air or other gas in the tubular chamber 2, different means are employed for the purpose from that illustrated in Fig. 1. Moreover, I have illustrated as the chief departure from the apparatus illustrated in Fig. 1 means for introducing an oxidizing gas into and passing it through the chamber in which the milk is subjected to the action of electric current. Either pure oxygen gas or air sterilized, as for example by filtering, may be introduced into the chamber 2 in this modification of my invention, or both of said gases may be used, if desired. The object of this treatment is to maintain a pure gaseous atmosphere in each section of the tube 2 through which the milk passes, and to effect the destruction of bacteria in the milk partly by such an oxidizing gas introduced into the apparatus while electric current is passing through the milk. In this modification of my process and apparatus the milk is simultaneously subjected to electrical action for destroying bacteria in the milk and to the action of pure oxygen gas or pure air for destroying the bacteria in the milk.

57 indicates a reservoir or tank containing pure oxygen gas and 58 a similar reservoir or tank containing sterilized filtered air. The oxygen tank 57 is connected with the interiors of alternate sections 7 of the pipe 2 by means of tubes, such as 59, 60, 61, 62, 63 and 64. In a similar manner the airtank 58 is connected by other pipes, such as 65, 66, 67, 68, 69 and 70 with the interiors of the intermediate sections 7, so that in alternate sections 7 of the tube 2 the milk may be subjected to the action of either pure oxygen gas or pure air or to the simultaneous action in alternate sections of both pure oxygen and pure air. The flow of either of these pure oxidizing gases through the chamber in which the milk is treated is upward, and the extreme upper ends of the pipes 64 and 70 connected with the tanks 57 and 58 may be closed by stop-cocks 71 and 72, by means of which the flow of the respective gases through the chamber 2 may be controlled.

Each system of pipes connected with the tank 57 or with the tank 58 should have therein an automatic pressure-regulating device having the same function as the regulating device shown at 33, and preferably substantially similar thereto. Thus two bags 73 and 74 are shown in the respective systems of piping each of which is similar to but smaller than the bag 33 and operates in substantially the same manner as the bag 33 to compensate for differences in pressure in the main pipe 2 and in the pipe connections thereto.

It will be seen that in both types of process and apparatus illustrated herein fine streams of milk are at successive points in the apparatus subjected to successive treatments by electric current flowing lengthwise of the moving streams of milk. At the highest point in the apparatus the electric current may not destroy all the bacteria in the falling streams through which such current passes, but the streams of milk are of such small area and there is such a violent agitation of the milk in each section 7 of the tube 2, and the current passing through the falling streams lengthwise of such streams has the particles of the milk so thoroughly exposed to its action that by the time the milk reaches the bottom of the main tube 2 every particle of the milk and all of the bacteria therein have been fully exposed to the action of the electric current and of the nascent ozone generated in the milk by electro-chemical reaction on the passage of the current through the liquid, and all without any exposure of the milk to the outside air or to any air or gas other than is confined within the apparatus and always under the influence of such electric current and nascent ozone. Under such conditions I have found that there is no chance of contamination of the milk during treatment, and when it issues from the apparatus it is free from all colonies of bacteria, is much improved in taste and is partially modified, it being much more readily digested than raw milk. When milk is completely inclosed in the manner described herein throughout the whole period of its treatment the only bacteria to be considered and destroyed are those contained and propagated in the milk, and it is impossible for the milk during treatment to become contaminated by air bacteria from the outside air, as the milk is never during treatment in contact with the outside air.

What I claim is:

1. The method of treating milk to destroy bacteria therein, which consists in establishing in a closed chamber out of contact with the outside air a flow of a stream of milk, partially interrupting said flow at a plurality of points in the length of the stream of milk and treating the milk by passing lengthwise through the flowing stream at each of said points an alternating current of electricity having a pressure of not less than one thousand volts and thereby effecting at said points successive reductions in the number of colonies of bacteria in the milk, and intermittently cooling said treated milk without delay.

2. The method of treating milk to destroy bacteria therein, which consists in establishing in a closed chamber out of contact with the outside air a flow of a stream of milk of large area, partially and intermittently retarding said flow at a plurality of points in the length of the stream and thereby increasing the length of time that the milk is subjected to treatment at such points, passing lengthwise through substantially every point in the cross section of the flowing stream at each of said retarding points an alternating current of electricity having a pressure of not less than one thousand volts and thereby effecting at said retarding points successive reductions in the number of colonies of bacteria in the milk, and cooling said treated milk without delay.

Signed at New York, in the county of New York, and State of New York, this 5th day of January, A. D. 1907.

JAMES L. GOUCHER.

Witnesses:
ROBERT CHAMPION,
JOHN A. JONES.